US008087148B2

(12) United States Patent
Kim et al.

(10) Patent No.: US 8,087,148 B2
(45) Date of Patent: Jan. 3, 2012

(54) STRUCTURE OF DRIVING UNIT IN DRUM TYPE WASHING MACHINE

(75) Inventors: Jae Kyum Kim, Kyongsangnam-do (KR); Ho Cheol Kwon, Kyongsangnam-do (KR); Jong A Park, Kyongsangnam-do (KR); Kang Mo Choi, Kyongsangnam-do (KR)

(73) Assignee: LG Electronics Inc., Seoul (KR)

(*) Notice: Subject to any disclaimer, the term of this patent is extended or adjusted under 35 U.S.C. 154(b) by 1054 days.

(21) Appl. No.: 11/453,037

(22) Filed: Jun. 15, 2006

(65) Prior Publication Data

US 2006/0230618 A1 Oct. 19, 2006

Related U.S. Application Data

(63) Continuation of application No. 10/669,445, filed on Sep. 25, 2003, now Pat. No. 7,131,178, which is a continuation of application No. 10/231,314, filed on Aug. 30, 2002, now Pat. No. 7,114,355, which is a continuation of application No. 09/624,144, filed on Jul. 21, 2000, now Pat. No. 6,460,382.

(30) Foreign Application Priority Data

Oct. 18, 1999 (KR) ................................ 1999-45088
Oct. 18, 1999 (KR) ................................ 1999-45089

(51) Int. Cl.
*D06F 29/00* (2006.01)
*D06F 35/00* (2006.01)

(52) U.S. Cl. ........................................ 29/525.01; 68/24

(58) Field of Classification Search ............... 29/525.01; 68/14, 23.7, 23 R, 23.1, 23.2, 23.3, 23.6, 68/24
See application file for complete search history.

(56) References Cited

U.S. PATENT DOCUMENTS 2,531,225 A 11/1950 Le Tourneau
(Continued)

FOREIGN PATENT DOCUMENTS

DE 31 05 318 8/1982
(Continued)

OTHER PUBLICATIONS

Request for Reexamination of U.S. Patent No. 6,914,363 filed Dec. 5, 2008.

(Continued)

*Primary Examiner* — David Bryant
*Assistant Examiner* — Christopher Koehler
(74) *Attorney, Agent, or Firm* — KED & Associates, LLP

(57) ABSTRACT

A drum type washing machine is provided. The washing machine includes a tub mounted in a cabinet, a drum mounted in the tub, a shaft that transmits a driving force from a motor to the drum, front and rear bearings mounted on an outer circumference of opposite end portions of the shaft, a bearing housing built in a central portion of a rear wall of the tub to support the front bearing, a rotor coupled to the rear end portion of the shaft, a stator fixed to the tub rear wall inward of the rotor, and a connector of the rotor that serration coupled to the outer circumference of the shaft in front of the rear bearing so as to transmit rotating power from the rotor to the shaft. A bearing bracket may be fixed to the rear wall of the tub so as to cover an outside of the rotor and support the rear bearing.

11 Claims, 10 Drawing Sheets

U.S. PATENT DOCUMENTS

| | | | | | |
|---|---|---|---|---|---|
| 2,656,702 | A | | 10/1953 | Chapin | |
| 3,138,727 | A | | 6/1964 | Ellner | |
| 3,194,032 | A | * | 7/1965 | Von Brimer | 68/23 R |
| 3,227,030 | A | | 1/1966 | Preziosi et al. | |
| 3,248,908 | A | | 5/1966 | Pope | |
| 3,333,443 | A | | 8/1967 | Chung et al. | |
| 3,604,222 | A | | 9/1971 | Wutherich et al. | |
| 3,840,764 | A | | 10/1974 | Burger | |
| 3,914,963 | A | | 10/1975 | Brimer | |
| 4,423,607 | A | | 1/1984 | Munini | |
| 4,446,706 | A | | 5/1984 | Hartwig | |
| 4,623,812 | A | | 11/1986 | Van de Griend | |
| 4,686,399 | A | | 8/1987 | Imori et al. | |
| 4,701,653 | A | | 10/1987 | Merkle et al. | |
| 4,712,035 | A | | 12/1987 | Forbes et al. | |
| 4,734,604 | A | | 3/1988 | Sontheimer et al. | |
| 4,853,571 | A | | 8/1989 | Smith et al. | |
| 4,995,598 | A | | 2/1991 | Ingham | |
| 4,998,052 | A | | 3/1991 | Erdman et al. | |
| 5,040,285 | A | | 8/1991 | Williams et al. | |
| 5,150,589 | A | * | 9/1992 | Williams et al. | 68/23.7 |
| 5,329,791 | A | | 7/1994 | Cargnel et al. | |
| 5,353,613 | A | * | 10/1994 | Smith et al. | 68/23.7 |
| 5,463,883 | A | | 11/1995 | Pellerin et al. | |
| 5,489,811 | A | | 2/1996 | Kern et al. | |
| 5,497,040 | A | | 3/1996 | Sato | |
| 5,528,092 | A | | 6/1996 | Ohta | |
| 5,586,455 | A | | 12/1996 | Imai | |
| 5,659,216 | A | | 8/1997 | Bisantz | |
| 5,677,816 | A | | 10/1997 | Oh | |
| 5,737,944 | A | * | 4/1998 | Nishimura et al. | 68/23.7 |
| 5,778,703 | A | | 7/1998 | Imai et al. | |
| 5,809,809 | A | | 9/1998 | Neumann | |
| 5,825,108 | A | | 10/1998 | De Filippis | |
| 5,862,686 | A | * | 1/1999 | Skrippek | 68/140 |
| 5,874,796 | A | | 2/1999 | Petersen | |
| 5,894,746 | A | | 4/1999 | Skrippek | |
| 5,907,206 | A | | 5/1999 | Shiga et al. | |
| 5,966,379 | A | | 10/1999 | Phillips et al. | |
| 5,975,846 | A | | 11/1999 | Wistinghausen | |
| 5,996,379 | A | | 12/1999 | Skrippek | |
| 6,006,553 | A | | 12/1999 | Lee et al. | |
| 6,023,839 | A | | 2/2000 | Kinoshita | |
| 6,049,930 | A | | 4/2000 | Hisano et al. | |
| 6,050,113 | A | | 4/2000 | Skrippek et al. | |
| 6,131,422 | A | | 10/2000 | Skrippek et al. | |
| 6,148,647 | A | * | 11/2000 | Kabeya et al. | 68/140 |
| 6,257,027 | B1 | | 7/2001 | Imai | |
| 6,339,275 | B1 | | 1/2002 | Katagiri | |
| 6,341,507 | B1 | | 1/2002 | Rode et al. | |
| 6,396,190 | B1 | | 5/2002 | Ahn et al. | |
| 6,626,014 | B2 | | 9/2003 | Heyder et al. | |
| 6,661,550 | B2 | | 12/2003 | Konno et al. | |
| 6,681,602 | B2 | | 1/2004 | Heyder et al. | |
| 7,380,424 | B2 | | 6/2008 | Kim et al. | |
| 7,444,841 | B2 | | 11/2008 | Kim et al. | |
| 2002/0194884 | A1 | | 12/2002 | Heyder et al. | |
| 2006/0196233 | A1 | | 9/2006 | Kim et al. | |
| 2007/0113597 | A1 | | 5/2007 | Kim | |
| 2007/0125135 | A1 | | 6/2007 | Kim et al. | |

FOREIGN PATENT DOCUMENTS

| | | | |
|---|---|---|---|
| DE | 36 14 703 | | 11/1986 |
| DE | 4335966 | A1 | 4/1995 |
| DE | 4341832 | | 6/1995 |
| DE | 36 34 214 | | 4/1998 |
| DE | 19724475 | A1 | 12/1999 |
| DE | 10058409 | | 5/2002 |
| EP | 0 043 429 | | 1/1982 |
| EP | 0 198 554 | | 10/1986 |
| EP | 0219 115 | | 4/1987 |
| EP | 0 354 158 | | 2/1990 |
| EP | 0 361 775 | | 4/1990 |
| EP | 0 374 519 | | 6/1990 |
| EP | 0620308 | A2 | 10/1994 |
| EP | 0 629 735 | | 12/1994 |
| EP | 0657575 | | 11/1995 |
| EP | 0 780 507 | | 6/1997 |
| EP | 0789 103 | | 8/1997 |
| EP | 0953668 | | 11/1999 |
| EP | 1094144 | | 12/2003 |
| EP | 1548171 | | 6/2005 |
| EP | 1619286 | | 1/2006 |
| GB | 701511 | | 12/1953 |
| GB | 2006836 | | 5/1979 |
| GB | 2 030 896 | | 4/1980 |
| GB | 2189511 | | 10/1987 |
| GB | 2202867 | | 5/1988 |
| GB | 2261881 | | 6/1993 |
| GB | 2272913 | | 6/1994 |
| GB | 2322240 | | 6/1998 |
| GB | 2 332 212 | | 6/1999 |
| GB | 2333300 | | 7/1999 |
| JP | 58207834 | | 12/1983 |
| JP | 60-5197 | | 1/1985 |
| JP | 61-17877 | | 2/1986 |
| JP | 2-14278 | | 1/1990 |
| JP | 4317547 | | 11/1992 |
| JP | 5-176488 | | 7/1993 |
| JP | 7-68086 | | 3/1995 |
| JP | 8019229 | | 1/1996 |
| JP | 7-259866 | | 11/1996 |
| JP | 09-103596 | | 4/1997 |
| JP | 09-182368 | | 7/1997 |
| JP | 11-89198 | | 3/1999 |
| JP | 11-137884 | | 5/1999 |
| JP | 11-207077 | | 8/1999 |
| JP | 11-207086 | | 8/1999 |
| JP | 11-239692 | | 9/1999 |
| JP | 11-276777 | | 10/1999 |
| JP | 11-285205 | | 10/1999 |
| JP | 2000-042287 | | 2/2000 |
| JP | 11-28298 | | 11/2000 |
| JP | 2000-325693 | | 11/2000 |
| JP | 2000-334194 | | 12/2000 |
| KR | 10-1998-0058943 | | 10/1998 |
| KR | 10-1999-0030909 | | 5/1999 |
| KR | 10-1997-0051370 | A | 10/1999 |
| KR | 2000-77232 | | 12/2000 |
| WO | 95/17543 | | 6/1995 |
| WO | WO 98/00902 | | 1/1998 |
| WO | WO 98/36123 | | 8/1998 |
| WO | WO 01/44556 | | 6/2001 |

OTHER PUBLICATIONS

Corrected Request for Reexamination No. 90/009,331 of U.S. Patent No. 6,460,382 filed Jan. 28, 2009.

Decision Granting Request for Reexamination No. 90/009,331 of U.S. Patent No. 6,460,382 issued Feb. 26, 2009.

Corrected Request for Reexamination No. 90/009,349 of U.S. Patent No. 6,914,363 filed Feb. 9, 2009.

Decision Granting Request for Reexamination No. 90/009,349 of U.S. Patent No. 6,914,363 issued Apr. 27, 2009.

European Patent Specification 219,115 (Apr. 1987).

European Search Report for EP 04 07 7356.

Complaint in pending litigation against ASKO Appliance Inc. et al. filed on Nov. 5, 2008.

Defendants' Reply in Further Support of Motion to Stay Litigation in pending litigation against ASKO Appliance Inc. et al. on filed May 29, 2009.

Declaration in Support of Defendants' Reply in pending litigation against ASKO Appliance Inc. et al. filed on May 29, 2009.

Order Denying Defendants' Motion for Stay and Dismissing Plaintiff's Motion for Preliminary Injunction in pending litigation against ASKO Appliance Inc. et al. filed on Jun. 17, 2009.

Korean Decision / *LG Electronics Inc.* v. *Daewoo Electronics, Ltd.*—Provisional Disposition to Inhibit Infringement, (Jun. 2007)—and English Language Translation.

Japanese Decision / LG Electronics Inc.—Appeal filed in regard to "Structure of Driving Unit in Drum Type Washing Machine", JP 2000-246072, (Apr. 2007)—and English Language Translation.

European Office Actions dated Oct. 28, 2008 (4).

Request for Reexamination of U.S. Patent No. 6,460,382 filed Nov. 14, 2008.
Corrected Request for Reexamination No. 90/009,330 of U.S. Patent No. 7,380,424 filed Jan. 28, 2009.
Decision Granting Request for Reexamination No. 90/009,330 of U.S. Patent No. 7,380,424 issued Feb. 26, 2009.
Notice of Intent to Issue a Reexamination Certificated for Reexamination No. 90/009,330 of U.S. Patent No. 7,380,424 dated Nov. 20, 2009.
Request for Reexamination of U.S. Patent No. 7,418,843 filed Dec. 15, 2008 (Reexamination Control No. 90/009,362).
Decision Granting Request for Reexamination No. 90/009,362 of U.S. Patent No. 7,418,843 issued Jan. 23, 2009.
Office Action dated Nov. 4, 2009 issued in U.S. Appl. No. 90/009,362.
Office Action dated Nov. 20, 2009 issued in U.S. Appl. No. 90/009,331.
Substance of Interview dated Nov. 16, 2009 issued in U.S. Appl. No. 90/009,349.
Amendment dated Oct. 28, 2009 issued in U.S. Appl. No. 90/009,349.
Interview Summary dated Oct. 15, 2009 issued in U.S. Appl. No. 90/009,349.
Office Action dated Aug. 28, 2009 issued in U.S. Appl. No. 90/009,349.
Notice of Allowance issued in Japanese Application No. 2003-133510 dated Nov. 22, 2010.
Notice of Allowance issued in Japanese Application No. 2004-331277 dated Nov. 22, 2010.

* cited by examiner

STRUCTURE OF DRIVING UNIT IN DRUM TYPE WASHING MACHINE

This is a Continuation of prior application Ser. No. 10/669,445, filed on Sep. 25, 2003 now U.S. Pat. No. 7,131,178, entitled METHOD OF FORMING A DRUM TYPE WASHING MACHINE HAVING A DRIVING UNIT, which itself is a Continuation of application Ser. No. 10/231,314, filed on Aug. 30, 2002 now U.S. Pat. No. 7,114,355, which in turn is a Continuation of application Ser. No. 09/624,144, filed on Jul. 21, 2000, which has matured into U.S. Pat. No. 6,460,382.

BACKGROUND OF THE INVENTION

1. Field of the Invention

The present invention relates to a drum type washing machine, and more particularly, to a structure of a driving unit in a drum type washing machine.

2. Background of the Invention

In general, a drum type washing machine washes using friction between a drum rotated by a motor and laundry, detergent, and washing water, introduced into the drum, and provides effects of beating and rubbing while doing almost no damage to the laundry, and causing no entangling of the laundry. A structure of a related art drum washing machine will be explained with reference to FIG. 1. FIG. 1 illustrates a longitudinal section of a related art drum type washing machine, provided with a tub 2 mounted inside of a cabinet 1, a drum 3 rotatably mounted on a central portion of inside of the tub 2. There is a motor 5*a* under the tub 2 connected with a pulley 18. There is a drum shaft 4 connected to a rear of the drum 3, to which a drum pulley 19 is coupled. And, the drum pulley 19 on the drum shaft 4 and the motor pulley 18 connected to the motor 5*a* are connected by a belt 20 for transmission of power. And, there is a door 21 in a front part of the cabinet 1, with a gasket 22 between the door 21 and the tub 2. There is a hanging spring 23 between an inside of an upper portion of the cabinet 1 and an outside of an upper portion of the tub 2, and a friction damper 24 between an inside of a lower portion of the cabinet 1 and a lower side of an outside of the tub 2 for damping vibration of the tub 2 generated during spinning.

However, the related art washing machine has the following disadvantages since driving power of the motor 5*a* is transmitted to the drum 3 through the motor pulley 18, and the drum pulley 19, and the belt 20 connecting the motor pulley 18 and the drum pulley 19.

First, there is a loss of energy in the course of transmitting driving power because the driving power is transmitted from the motor 5*a* to the drum 3, not directly, but through the belt 20 wound around the motor pulley 18 and the drum pulley 19.

And, the transmission of driving power from the motor 5*a* to the drum 3, not directly, but through many components, such as the belt 20, the motor pulley 18, and the drum pulley 19, causes much noise in the course of power transmission.

The numerous components required for transmission of driving power from the motor 5*a* to the drum 3, such as the motor pulley 18, the drum pulley 19 and the belt 20, require many assembly man-hours. And, the more the number of components required for transmission of driving power from the motor 5*a* to the drum 3, the more number of spots which require repair, and the more frequent at which repair required.

In summary, the indirect driving power transmission from the motor 5*a* to the drum 3 through the motor pulley, the drum pulley, and the belt requires many repairs, generates much noise, wastes energy, and results in a deterioration of a washing capability.

Moreover, the tub 2 of stainless steel in general in the related art drum washing machine is expensive, has poor formability, and is heavy.

SUMMARY OF THE INVENTION

Accordingly, the present invention is directed to a structure of a driving unit in a drum type washing machine that substantially obviates one or more of the problems due to limitations and disadvantages of the related art.

An object of the present invention is to provide a structure of driving unit in a drum type washing machine, which can reduce noise, repair and waste of energy, and moreover, improve washing capability.

Another object of the present invention is to provide a structure of driving unit in a drum type washing machine, which has an improved supporting force.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the structure of a driving unit in a drum type washing machine having a tub mounted in a cabinet, a drum mounted in the tub, a shaft fixed to the drum for transmission of driving power from the motor to the drum, and bearings mounted on an outer circumference of the shaft at opposite end portions thereof, includes a metallic bearing housing at a central portion of a rear wall of the tub for supporting the bearings mounted on the outer circumferences of opposite end portions of the shaft.

In other aspect of the present invention, there is provided a structure of driving unit in a drum type washing machine including a tub mounted inside of a cabinet, a bearing housing built in a central portion of a rear wall of the tub for supporting a bearing therein, a shaft connected to a drum mounted inside of the tub for transmission of a driving force from a motor to the drum, bearings mounted on an outer circumference of the shaft at opposite end portions thereof respectively, a rotor coupled to a rear end of the shaft, a stator provided inward of the rotor fixed to the tub rear wall, a connector provided between the shaft and the rotor for transmission of a rotating force from the rotor to the shaft for rotating the shaft and the rotor together, and a supporter fitted between the rear wall of the tub and the stator for supporting the stator and maintaining a concentricity when the stator is mounted to the tub rear wall.

In another aspect of the present invention, there is provided a structure of driving unit in a drum type washing machine including a tub of plastic mounted inside of a cabinet, a metallic bearing housing inserted and built in a central portion of a rear wall of the tub having steps of "⌉" and "⌊" forms on an inner circumference for supporting bearings therein, a shaft connected to a drum mounted inside of the tub for transmission of a driving power from a motor to the drum, having a front end portion fixed to a spider in the drum rear wall, a brass bushing press fit on a region of the shaft from a portion exposed in rear of the spider to the front bearing for prevention of rusting of the shaft, and steps on an outer circumference thereof for fixing mounting positions of the front bearing and the rear bearing on the shaft, bearings mounted on the outer circumference of the shaft at opposite end portions thereof respectively, a rotor of steel or steel alloy plate coupled to the rear end portion of the shaft, including a bent portion formed along a circumference thereof having a setting surface for supporting magnets fitted to an inside of a front portion of a sidewall extended forward from a periphery of a rear wall, and a hub at a center of the rear wall having a through hole for a fastening member, such as a bolt, for coupling the rotor to the shaft, a plurality of cooling fins formed around the hub in a radial direction each with a length for blowing air toward the stator when the rotor is rotated for cooling down a heat generated at the stator, an embossing between adjacent cooling fins on the rear wall of the rotor for reinforcing the rotor, and a drain hole in each of the embossings, for drain of water, a stator composing the motor together with the rotor, fixed to the tub rear wall inward of the rotor, a connector of plastic provided between the shaft and the rotor for transmission of a rotating force from the rotor to the shaft for rotating the shaft and the rotor together, and a supporter fitted between the rear wall of the tub and the stator for supporting the stator and maintaining a concentricity when the stator is mounted to the tub rear wall.

In further aspect of the present invention, there is provided a structure of driving unit in a drum type washing machine including a tub mounted inside of a cabinet, a drum mounted inside of the tub, a shaft connected to the drum mounted inside of the tub for transmission of a driving force from a motor to the drum, a front bearing and a rear bearing mounted on an outer circumference of the shaft at opposite end portions thereof respectively, a bearing housing built in a central portion of a rear wall of the tub for supporting the front bearing, a rotor composing the motor together with the rotor, and coupled to the rear end portion of the shaft, a stator fixed to the tub rear wall inward of the rotor to compose the motor together with the rotor, a connector serration coupled to the outer circumference of the shaft in front of the rear bearing and fixed to the rotor, for transmission of a rotating power from the rotor to the shaft, and a bearing bracket fixed to the rear wall of the tub to cover an outside of the rotor and support the rear bearing.

In a still further aspect of the present invention, there is provided a structure of driving unit in a drum type washing machine including a tub of plastic mounted inside of a cabinet, a metallic bearing housing inserted to built in a central portion of a rear wall of the tub having steps on an inner circumference for supporting bearings therein, a shaft connected to a drum mounted inside of the tub for transmission of a driving power from a motor to the drum, having a front end portion fixed to a spider in the drum rear wall, and a brass bushing press fit on a region of the shaft from a portion exposed in rear of the spider to the front bearing for prevention of rusting of the shaft, bearings mounted on the outer circumference of the shaft at opposite end portions thereof respectively, a rotor of steel or steel alloy plate coupled to the rear end portion of the shaft, including a bent portion formed along a circumference thereof having a setting surface for supporting magnets fitted to an inside of a front portion of a sidewall extended forward from a periphery of a rear wall, and a hub at a center of the rear wall having a through hole for a fastening member, such as a bolt, for coupling the rotor to the shaft, a plurality of cooling fins formed around the hub in a radial direction each with a length for blowing air toward the stator when the rotor is rotated for cooling down a heat generated at the stator, an embossing between adjacent cooling fins on the rear wall of the rotor for reinforcing the rotor, and a drain hole in each of the embossings, for drain of water, a stator composing the motor together with the rotor, fixed to the tub rear wall inward of the rotor, a connector of plastic provided between the shaft and the rotor for transmission of a rotating force from the rotor to the shaft for rotating the shaft and the rotor together, a supporter fitted between the rear wall of the tub and the stator for supporting the stator and maintaining a concentricity when the stator is mounted to the tub rear wall, and a bearing bracket fixed to the rear wall of the tub to cover an outside of the rotor and support the rear bearing.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
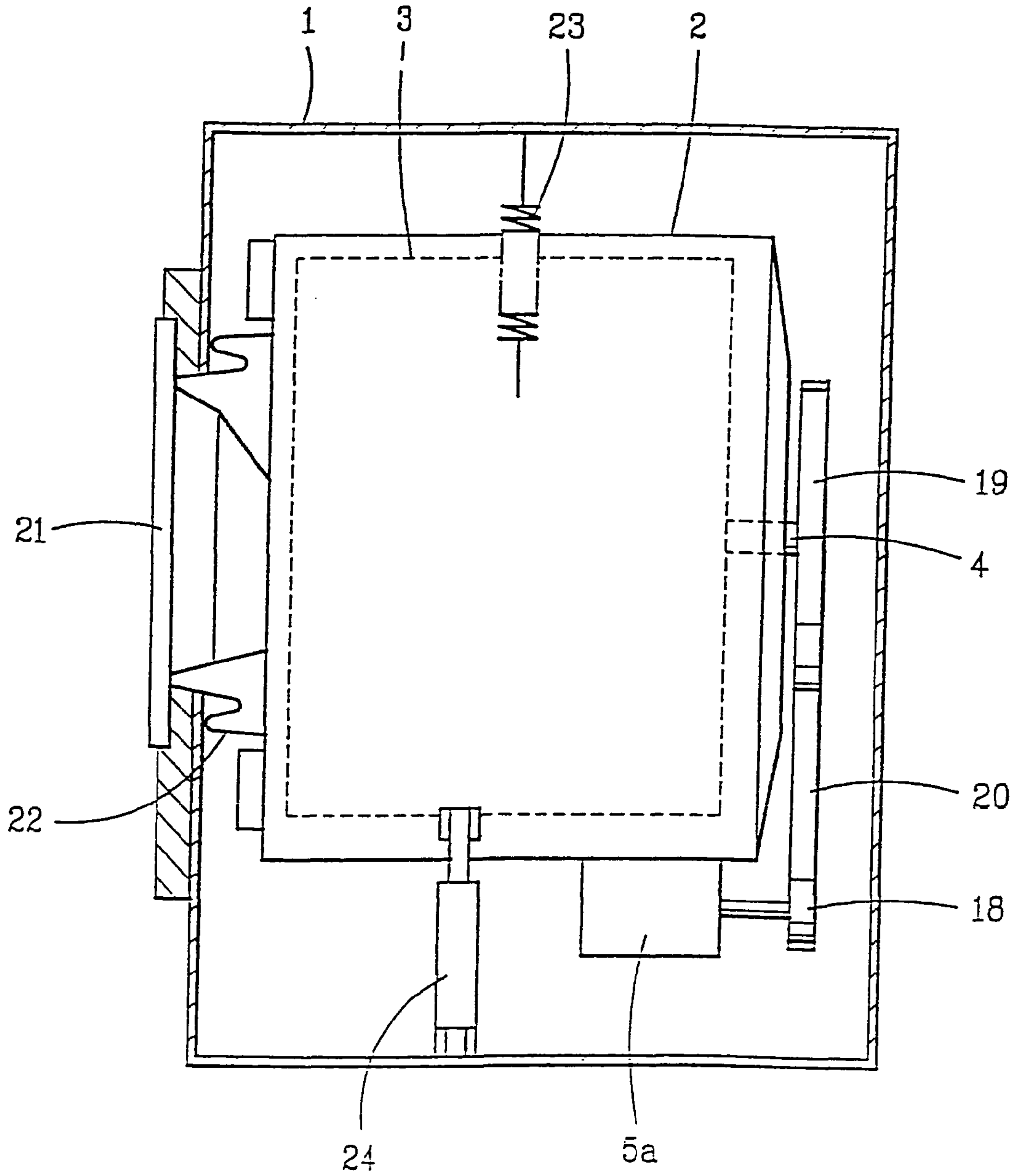
FIG. 1 illustrates a longitudinal section of a related art drum type washing machine.
Figure 2A:
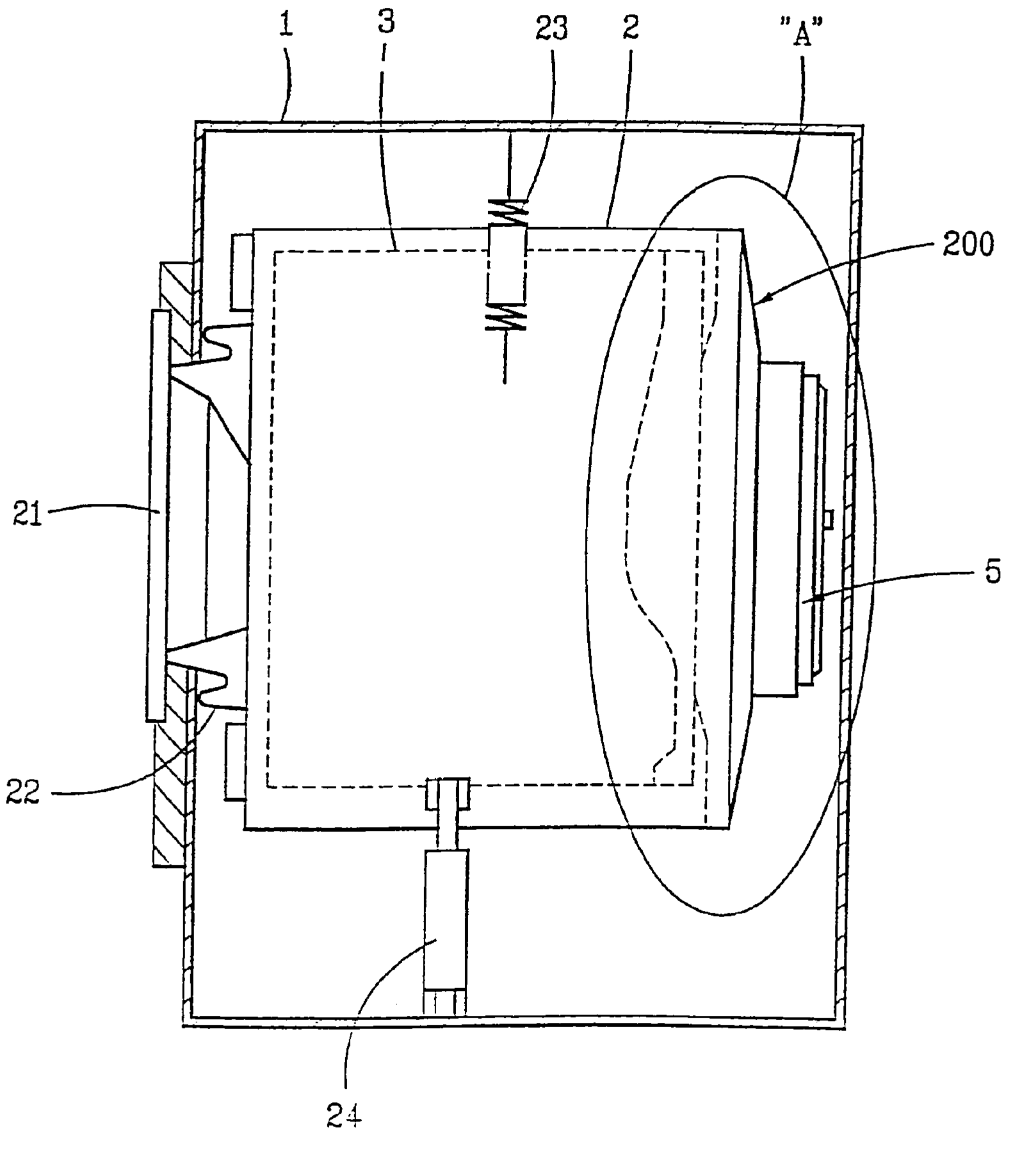
FIG. 2A illustrates a longitudinal section of a drum type washing machine in accordance with a first preferred embodiment of the present invention.
Figure 2B:
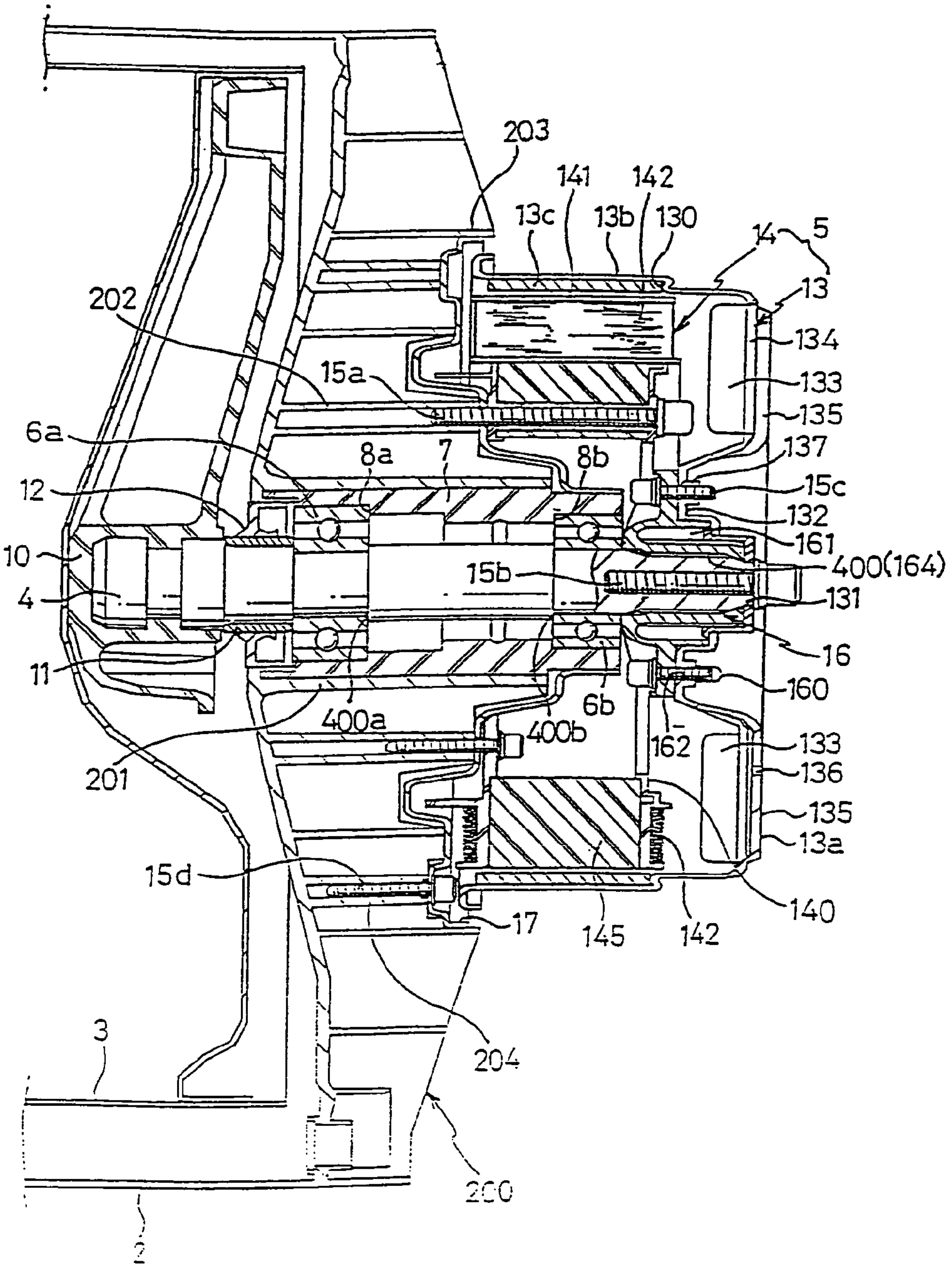
FIG. 2B illustrates a detailed enlarged view of "A" part in FIG. 2A.
Figure 6:
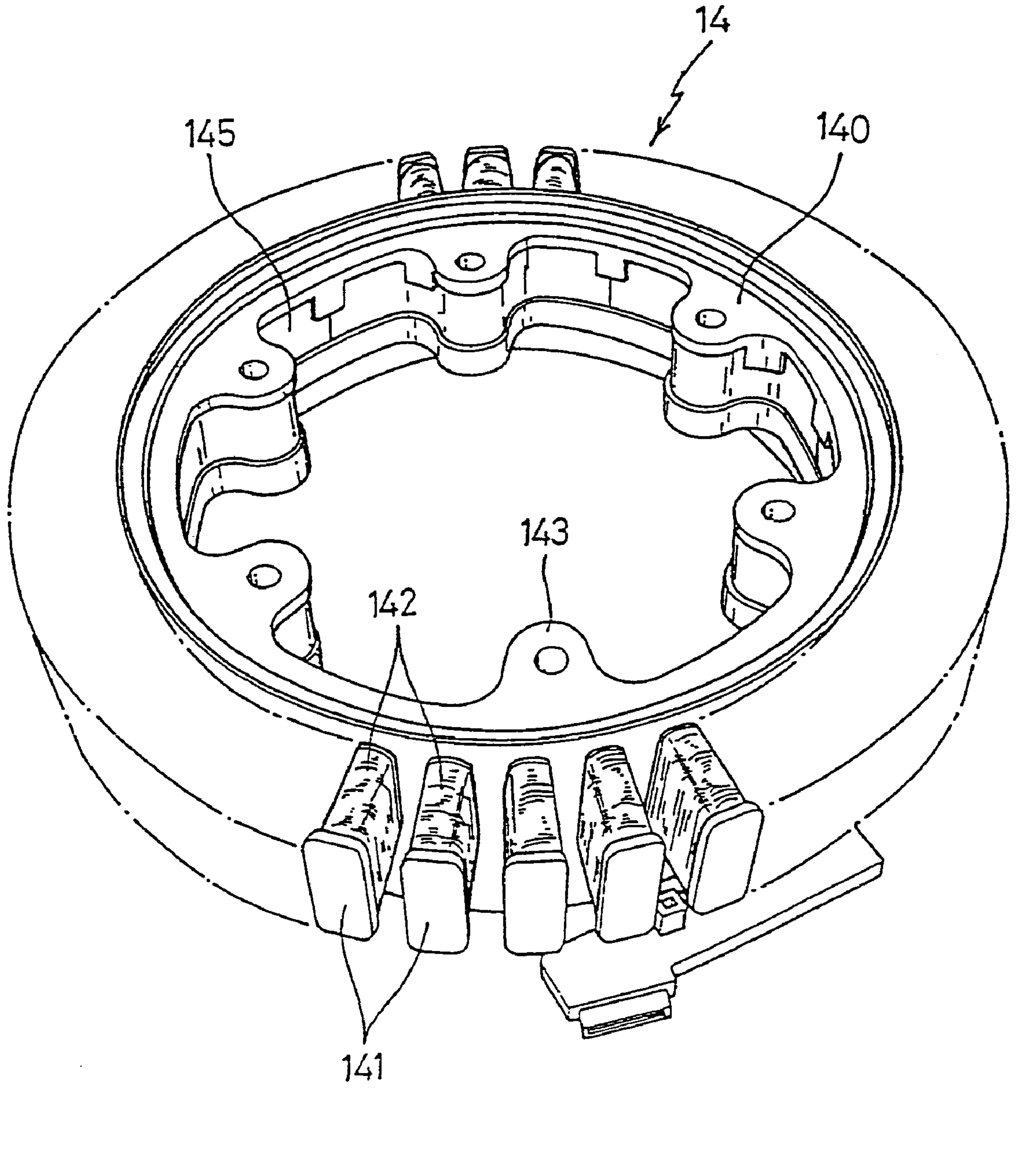
FIG. 6 illustrates a perspective view of the stator in FIG. 2.
Figure 7:
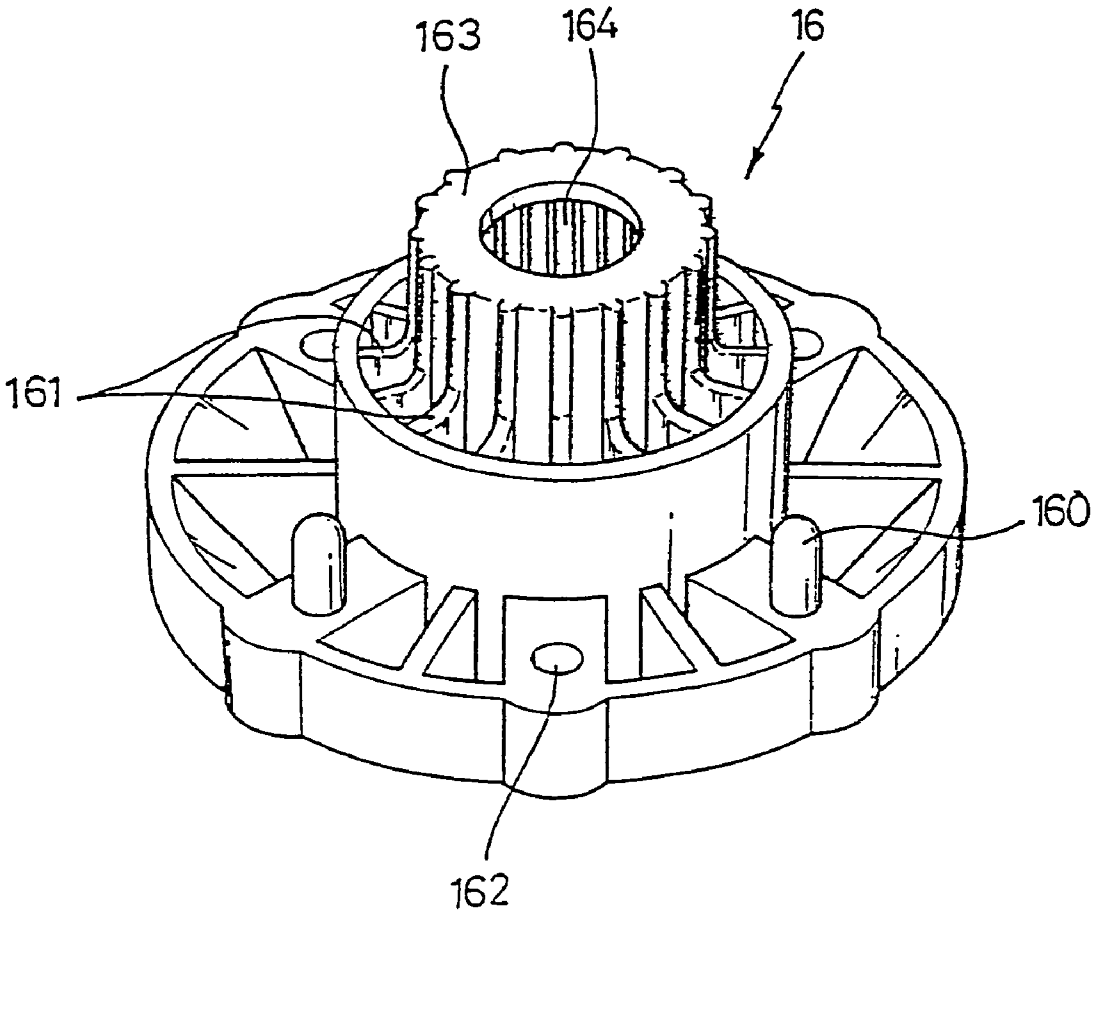
FIG. 7 illustrates a perspective view of the connector in FIG. 2.
Figure 8:
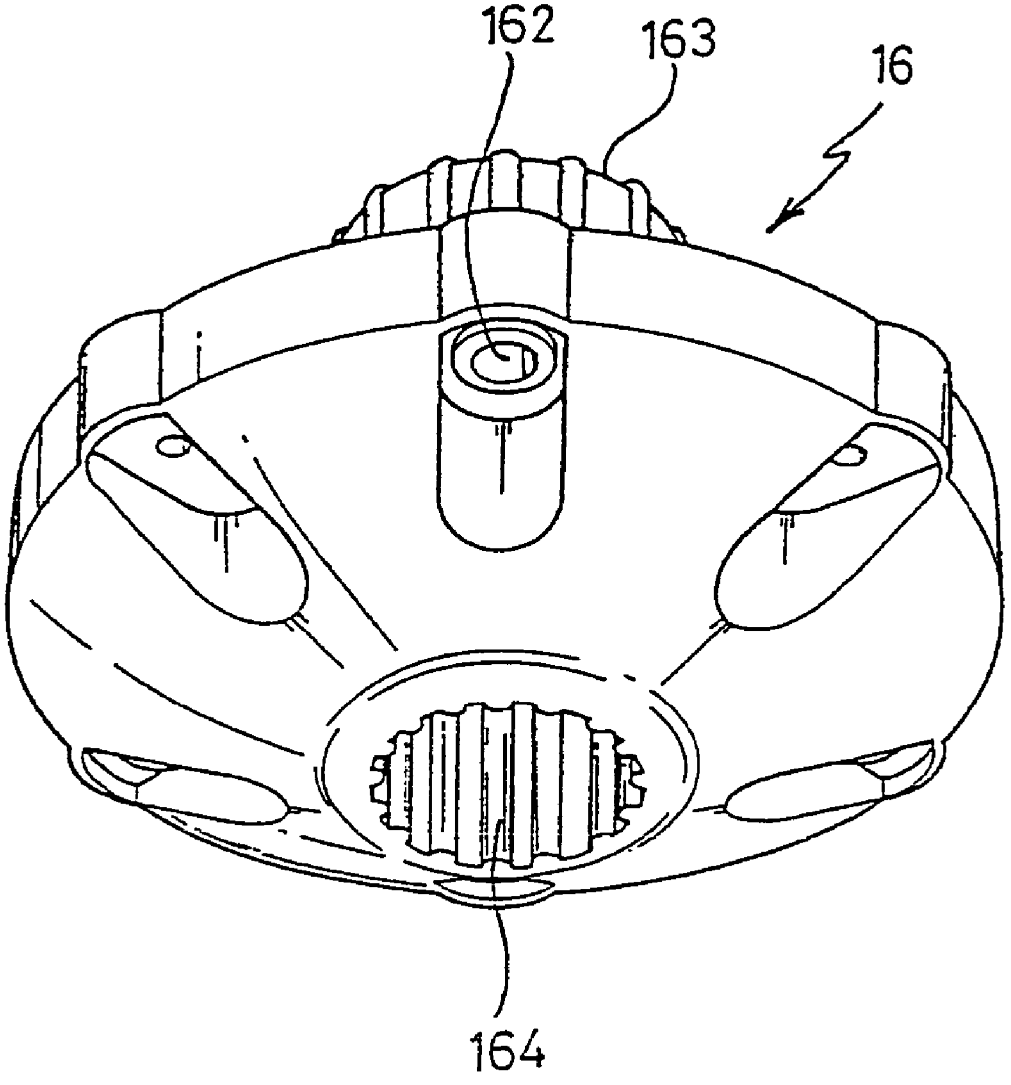
FIG. 8 illustrates a perspective view of a bottom in FIG. 7.

Reference will now be made in detail to the preferred embodiments of the present invention, examples of which are illustrated in the accompanying drawings. A first preferred embodiment of the present invention will be explained in detail with reference to FIGS. 2A~8. FIG. 2A illustrates a longitudinal section of a drum type washing machine in accordance with a first preferred embodiment of the present invention, FIG. 2B illustrates a detailed enlarged view of "A" part in FIG. 2A, FIG. 3 illustrates a perspective view with a partial cut away view of the rotor in FIG. 2, FIG. 4 illustrates an enlarged perspective view of "B" part in FIG. 3, FIG. 5 illustrates a perspective view of a bottom in FIG. 3, FIG. 6 illustrates a perspective view of the stator in FIG. 2, FIG. 7 illustrates a perspective view of the connector in FIG. 2, and FIG. 8 illustrates a perspective view of a bottom in FIG. 7.

The drum type washing machine in accordance with a first preferred embodiment of the present invention includes a tub 2 of plastic mounted inside of the cabinet 1, a drum 3 mounted in the tub 2, a shaft 4 fixed to the drum 3 for transmission of driving power from a motor 5 to the drum 3, bearings 6*a* and 6*b* fitted on outer circumference of the shaft 4 at both ends thereof, and bearing housings 7 of metal fitted to support the bearings 6*a* and 6*b* at a central portion of a rear wall 200 of the tub 2. The bearing housing 7 of metal is formed as a unit with the tub rear wall 200 by an inserted injection molding in the injection molding of the tub 2 of plastic. The bearing housing 7 is preferably formed of aluminum. The bearing housing 7 has steps 8*a* and 8*b* for holding the front bearing 6*a* and the rear bearing 6*b* fitted in inner circumferences of the bearing housing 7 for preventing the bearings 6*a* and 6*b* from being separated therefrom. Of the steps 8*a* and 8*b* formed on the inner circumferences of the bearing housing 7, the front step 8*a* has a form of "⌉" for supporting a rear end portion of the front bearing 6*a* fitted to a front end of an outer circumference of the shaft 4, and the rear step 8*b* has a form of "⌊" for supporting a front end portion of the rear bearing 6*b* fitted to a rear end portion of the shaft 4. And, there are positioning steps 400*a* and 400*b* on outer circumferences of the shaft 4 disposed inside of the bearing housing 7 which transmits driving power from the motor 5 to the drum 3, for fixing mounting positions of the front bearing 6*a* and the rear bearing 6*b* on the shaft 4. A front end of the shaft 4 is coupled to a spider 10 in a rear wall of the drum 3, a region of the shaft 4 that extends from a portion thereof exposed at a rear of the spider 10 to the front bearing 6*a* has a bushing 11 of brass press fit thereon for prevention of rusting, and there is a sealing member 12 on an outer surface of the bushing 11 for preventing ingress of water toward the bearing housing 7. There is a rotor 13 of a direct coupling type motor 5 fixed to a center of a rear end of the shaft 4, and a stator 14 having a crown form fixed to the rear wall 200 inside of the rotor 13. The rotor 13 and the stator 14 together form the direct coupling type motor 5.

Figure 3:
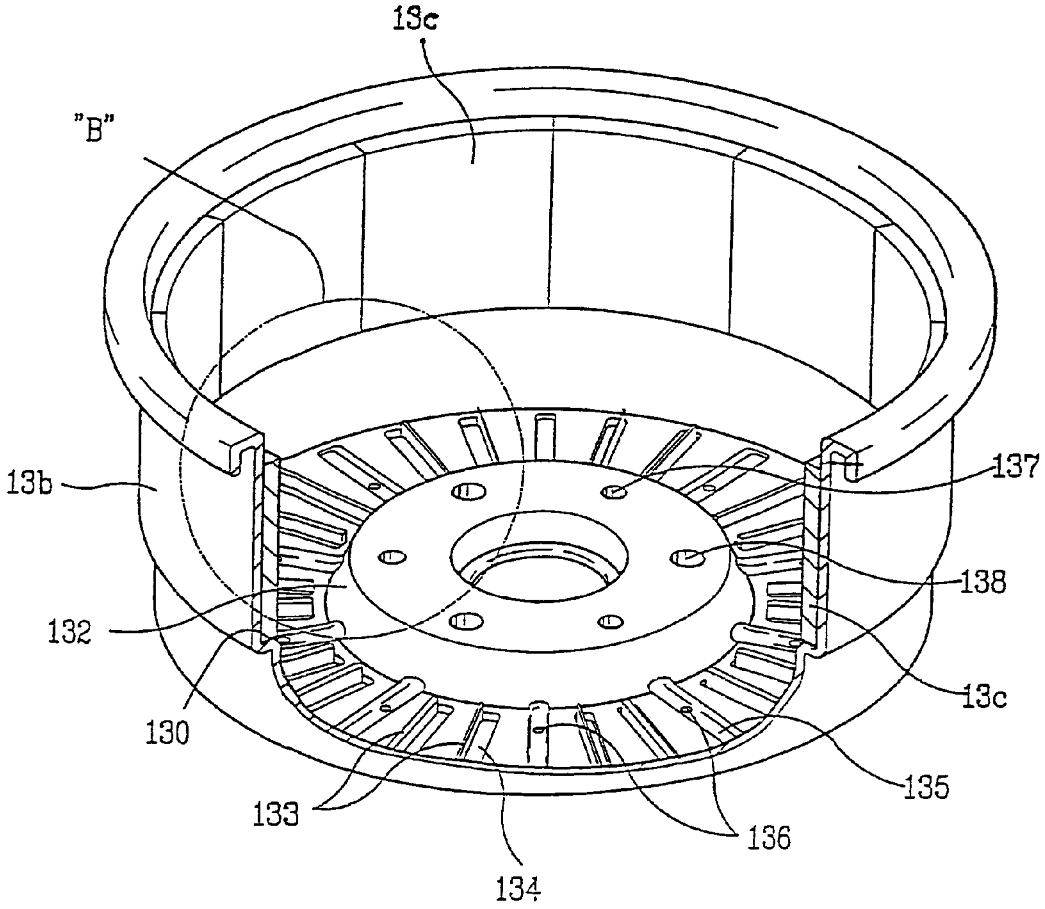
FIG. 3 illustrates a perspective view with a partial cut away view of the rotor in FIG. 2.
Figure 4:
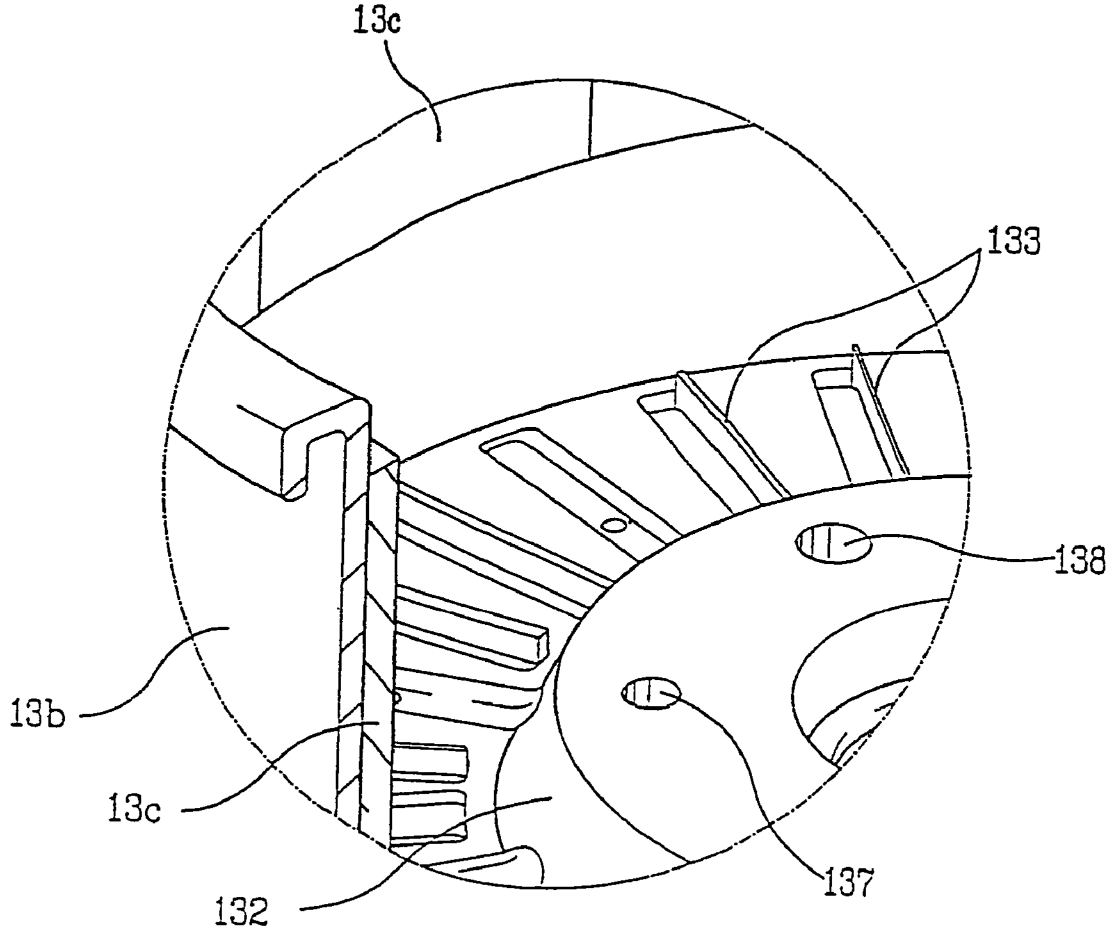
FIG. 4 illustrates an enlarged perspective view of "B" part in FIG. 3.
Figure 5:
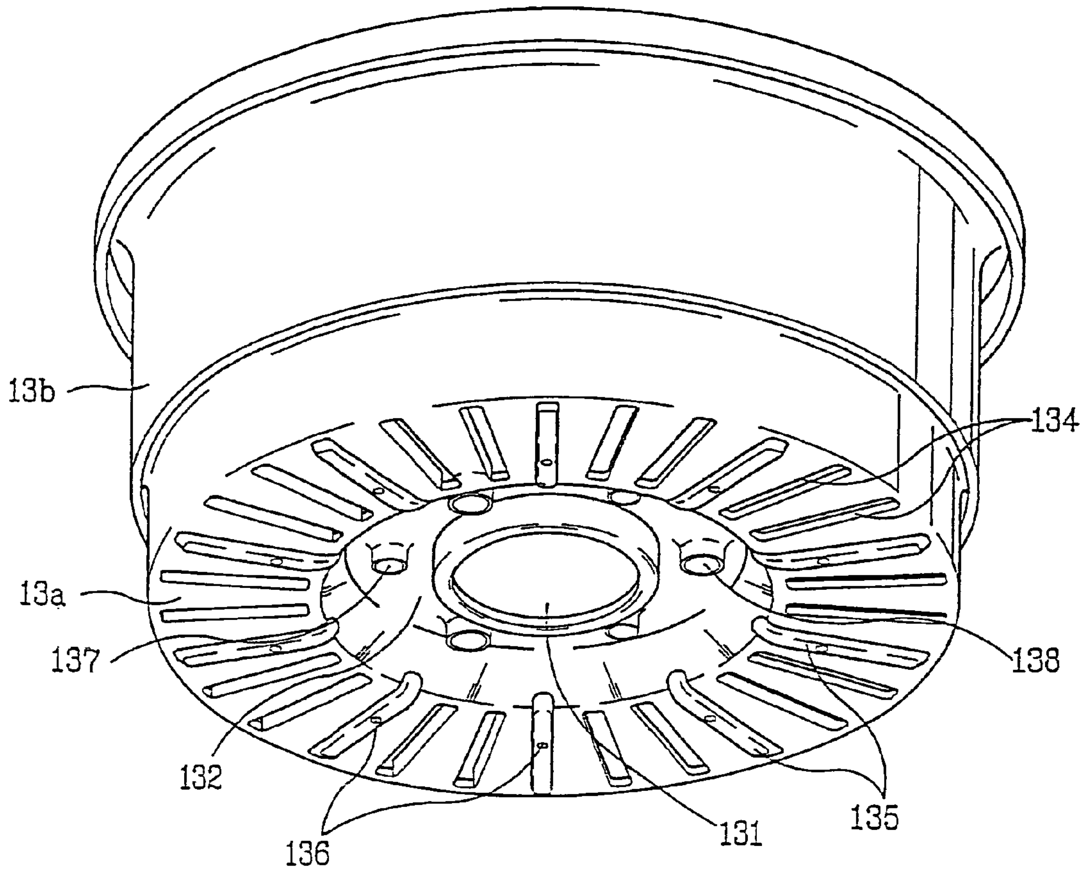
FIG. 5 illustrates a perspective view of a bottom in FIG. 3.

Referring to FIGS. 3~5, the rotor 13 of steel or steel alloy plate includes a bent portion formed along a circumference thereof having a setting surface 130 for supporting magnets 13*c* fitted to an inside of front of a sidewall 13*b* extended forward from a periphery of a rear wall 13*a*, and a hub 132 at a center of the rear wall 13*a* having a through hole 131 for fastening members 15*a*, such as bolts, for coupling the rotor 13 to the shaft 4. An overall form of the rotor 13 is preferably formed by press forming. There are a plurality of cooling fins 133 each formed to have a preset length in a radial direction around the hub 132 of the rotor 13 for blowing air toward the stator 14 during rotation of the rotor 13 for cooling heat generated at the stator 14. The cooling fins 133 are formed by lancing, to bend the cooling fins 133 at a right angle with respect to the rear wall 13*a* toward the opening so as to form through holes 134 for ventilation. There is an embossing 135 between adjacent cooling fins 133 with a drain hole 136 therein for draining water. There are fastening holes 137 for fastening a connector 16 formed to the rotor 13 and positioning holes 138 for positioning an assembly position of the connector 16 around the through hole 131 in the hub 132 of the rotor 13 at fixed intervals. The connector 16 is serration coupled to an outer circumference of a rear end portion of the shaft 4 exposed at a rear of the rear bearing 6*b*. The connector 16 is formed of resin having a vibration mode different from the rotor 13 of steel or steel alloy plate, and also serves as a bushing for the rotor 13. As shown in FIGS. 2B, 7 and 8, the connector 16 has fastening holes 162 to correspond to the fastening holes 137 in the hub 132 of the rotor 13, arranged in a circumferential direction of a peripheral region thereof, and a dowel pin 160 between adjacent fastening holes 162 formed as a unit with the connector 16 for insertion in the positioning holes 138 in the rotor 13 for self alignment of the fastening holes 137 and 162 in the rotor 13 and the connector 16, respectively. The connector 16 has a serration 164 in an inside circumference of the hub 163 matched to a serration on the rear end of the shaft 4, and reinforcing ribs 161 on outer circumference of the hub 163 for reinforcing the hub 163. There is a hub 201 on the rear wall 200 of the tub 2 having the bearing housing 7 inserted therein when the tub is injection molded, and fastening bosses 202 on an outer side of the hub 201 along a circumferential direction at fixed intervals for fastening the stator 14 to the rear wall 200 of the tub 2. There is a supporter 17 between the rear wall 200 of the tub 2 and the stator 14, of a form almost identical to an outline of the tub rear wall 200, fixed to the tub rear wall 200 when the stator 14 is assembled for supporting the stator 14 and maintaining concentricity of the stator 14. The supporter 17 has a fore end brought into a close contact with an inside of ribs 203 at one side of the tub rear wall 200, and a rear end brought into a close contact with an outer circumference of a rear end of the bearing housing 7 which is not enclosed by the hub 132, but exposed. In the meantime, as shown in FIGS. 2B and 6, the stator 14 includes a magnetic core 145 of segregated layers of magnetic material, a frame 140 of resin coated on the magnetic core 145, a coil 142 wound around each of winding parts 141 on an outer circumference of the frame 140, and fastening ribs 143 on an inside of the frame 140 for fastening the stator 14 to the tub rear wall 200.

The operation of the driving unit in a drum type washing machine in accordance with a first preferred embodiment of the present invention will be explained. The rotor 13 is rotated in response to a current flowing to the coils 142 of the stator 14 in a sequence under the control of a motor driving controller (not shown) fitted on a panel, and the shaft 4, which is serration coupled with the connector 16 fixed to the rotor 13 is rotated, together with the drum 3 as the power is transmitted to the drum 3 through the shaft 4.

The tub 2 of the drum type washing machine of the present invention, formed of a plastic with excellent heat resistance, is light and has good formability as the tub 2 is injection molded. Since the bearing housing 7 in the drum type washing machine of the present invention is formed of a metal, such as aluminum and the like, the bearing housing 7 is applicable to a drum type washing machine having a drying cycle, as the bearing housing shows no thermal deformation. And, since the metallic bearing housing 7 of the present invention is formed integrated with the tub 2 by inserting the bearing housing 7 in the hub 201 on the tub rear wall 200 before the tub 2 of plastic is injection molded, a separate step for assembling the bearing housing 7 to the tub rear wall 200 can be omitted, which simplifies an assembly process and reduces assembly man-hours. The "⌉" form of the step 8*a* in a front portion of an inner circumference of the bearing housing 7 and the "⌊" form of the step 8*b* in a rear portion of an inner circumference of the bearing housing 7 provide support to a rear end of the front bearing 6*a* and a fore end of the rear bearing 6*b* mounted on outer circumference of the shaft 4 at both end portions thereof. That is, the steps 8*a* and 8*b* on inner circumferences of the metallic bearing housing 7 on both sides thereof prevent both bearings 6*a* and 6*b* from being separated from the bearing housing 7. The positioning steps 400*a* and 400*b* on outer circumferences of the shaft 4 at front and rear portions thereof permit easy positioning of the front bearing 6*a* and the rear bearing 6*b* on the shaft 4 in the assembly. The front end portion of the shaft 4 is coupled to the spider 10 in the rear wall, and the brass bushing 11 press fit to the region from the exposed portion outside of the spider 10 of the shaft 4 to the front bearing 6*a* prevents rusting of the shaft 4. The sealing member 12 outside of the bushing 11 prevents ingress of water toward the bearing.

In the meantime, the rotor 13 of the direct coupling type motor 5 is mounted on a center of the rear end portion of the shaft 4, with the stator 14 disposed on an inner side of the rotor 13, wherein the bend part having the magnet setting surface 130 is formed along a circumferential direction of the sidewall 13*b*, extending forward from a periphery of the rear wall 13*a* of the rotor 13, for supporting the magnets 13*c* when the magnets 13*c* are fitted to an inside surface of the rotor 13, to fabricate the rotor with ease. The through hole 131 of the hub 132 at a center of the rear wall 13*a* of the rotor 13 permits the fastening member 15*b*, such as a bolt or the like, to pass therethrough for fastening the rotor 13 to the shaft 4, and the plurality of cooling fins 133 arranged around the hub 132 of the rotor 13 in a radial direction and having a certain length blow air toward the stator 14 during rotation of the rotor 13 for cooling down a heat generated at the stator 14. The cooling fins 133 are formed by lancing, so as to direct flow toward the opening of the rotor 13, and to leave through holes 134 for ventilation. The rotor 13 of steel or steel alloy plate is formed by pressing, which shortens a fabrication time period and improves productivity. The embossing 135 between the adjacent cooling fins 133 of the rear wall 13*a* of the rotor 13 improves an overall strength of the rotor 13, and the drain hole 136 in the embossing 135 drains water.

In the meantime, the fastening holes 137 for fastening the connector and the positioning holes 138 for fixing an assembly position of the connector 16 around the through hole 131 in the hub 132 of the rotor 13 permits an easy assembly of the connector 16 to the rotor. The connector 16 is serration coupled to the outer circumference of the rear end portion of the shaft 4 exposed to rear of the rear bearing 6*b*. That is, once the dowel pins 160 on the connector 16 are inserted in the positioning holes 138 in the rotor 13, the fastening holes 137 and 162 in the rotor 13 and the connector 16 are matched automatically, and by fastening the fastening members 15*c* through the fastening holes 137 and 162 in the rotor 13 and the connector 16, the connector 16 and the rotor 13 can be assembled with ease. The connector 16 serves to damp vibration from the rotor 13 to the shaft 4 as the connector 16, which is injection molded of a resin, has a different vibration mode from the rotor 13 of steel or steel alloy plate. The serration 164 in the inner circumference of the hub 163 of the connector 16 is fit to the serration 400 on the rear end portion of the shaft 4, to transmit the rotating force of the rotor 13 to the shaft, directly. The reinforcing ribs 161 on an outer circumference of the hub 163 of the connector 16 reinforce the hub 163.

In the meantime, the fastening bosses 202 along a circumference on an outer side of the hub 201 on the rear wall 200 of the tub 2 at fixed intervals allow the stator 14 to be fixed to the rear wall 200 of the tub 2 by using the fastening boss 202. The supporter 17 between the rear wall 200 of the tub 2 and the stator 14 having a form almost identical to the outline of the rear wall 200 so as to be fixed to the rear wall 200 of the tub 2 and have the stator 14 is fastened thereto permits the stator 14 to be supported and maintain concentricity. That is, once the supporter 17 is fastened to the fastening bosses 204 on the tub rear wall 200, the fore end of the supporter 17 is brought into close contact with an inside surface of the ribs 203 at one side of the tub rear wall 200 and the rear end of the supporter 17 is brought into close contact with the outer circumference of the rear end portion of the bearing housing 7 at a central portion of the tub rear wall 200, which can not be enclosed, but exposed, by the hub 132, such that the supporter 17 supports the stator 14 as well as maintains a concentricity of the stator 14.

The structure of a driving unit in a drum type washing machine in accordance with a first preferred embodiment of the present invention has the following advantages.

The motor direct coupling structure of the drum type washing machine in accordance with a first preferred embodiment of the present invention provides for reduced repair, and reduced power loss.

The bearing housing of metal in the drum type washing machine in accordance with a first preferred embodiment of the present invention shows no thermal deformation, allowing this to be applied to a product having a drying function.

The rotor of steel or steel alloy plate formed by pressing in the drum type washing machine in accordance with a first preferred embodiment of the present invention requires a very short fabrication time period, with improved productivity, because the steel or steel alloy plate pressing has excellent formability.

And, the magnet setting surface on the rotor of the present invention improves a workability in fitting the magnets, and the drain holes, the cooling fins, and the through holes provided to the rotor can prevent overheating of the motor, improve a reliability of the motor, and prolong a lifetime of the motor.

And, the connector having a vibration mode different from the rotor in the drum type washing machine of the present invention can attenuate the vibration transmitted from the rotor to the shaft, and the supporter can support the stator and maintain a concentricity of the stator.

Figure 9:
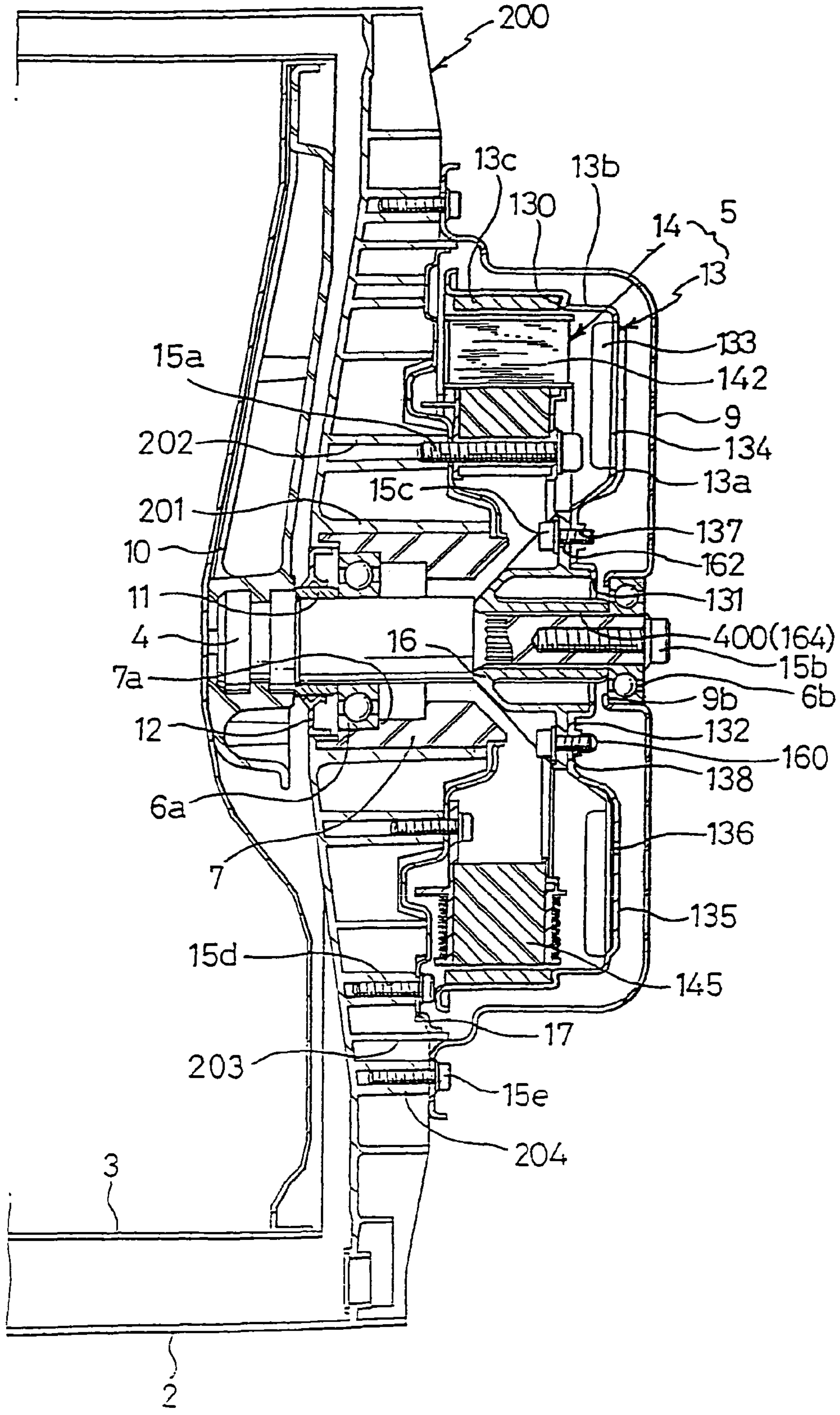
FIG. 9 illustrates a longitudinal section of a driving unit in a drum type washing machine in accordance with a second preferred embodiment of the present invention.

A driving unit in a drum type washing machine in accordance with a second preferred embodiment of the present invention will be explained with reference to FIGS. 3~9, in detail. FIG. 9 illustrates a longitudinal section of a driving unit in a drum type washing machine in accordance with a second preferred embodiment of the present invention. The rotor, the stator and the connector in the second preferred embodiment of the present invention are identical to those of the first embodiment, to which the same names and reference symbols are given, and will be explained with reference to FIGS. 3~8.

The drum type washing machine in accordance with a second preferred embodiment of the present invention includes a tub 2 mounted inside of a cabinet 1, a drum 3 mounted inside of the tub 2, a shaft 4 connected to the drum mounted inside of the tub 3 for transmission of a driving force from the motor 5 to the drum, a front bearing 6*a* and a rear bearing 6*b* mounted on outer circumferences of the shaft 4 at both end portions thereof respectively, a bearing housing 7 built in a central portion of the rear wall 200 of the tub 3 for supporting the front bearing 6*a*, a rotor 13 coupled to the shaft 4, a stator 14 provided inward of the rotor 13 coupled to the tub rear wall 200, a connector 16 that is serration coupled to an outer circumference of the shaft 4 in front of the rear bearing 6*b* and fixed to the rotor 13 for transmission of a rotating force of the rotor 13 to the shaft 4, a supporter 17 fitted between the rear wall 200 of the tub 2 and the stator 14 for supporting the stator 14 and maintaining a concentricity when the stator 14 is mounted to the tub rear wall 200, and a bearing bracket 9 fixed to the tub rear wall 200 for covering an outside of the rotor 13 and supporting the front end portion of the rear bearing 6*b*. The tub 2 is formed of plastic, and has an opened front and a closed rear wall 200 having a thickness that is greater than a thickness of a sidewall, and the bearing housing 7 at the central portion of the rear wall 200 of the tub 2 is formed of a metal, wherein the bearing housing 7 is insert injection molded when the plastic tub 2 is injection molded, such that the bearing housing 7 is integrated with the tub rear wall 200. The bearing housing 7 is preferably formed of an aluminum alloy.

In the meantime, there is a step 7*a* on an inner circumference of the metallic bearing housing 7 for supporting the front bearing 6*a* to prevent the front bearing 7 from being separated from the bearing housing 7. The step 7*a* on the inner circumference of the bearing housing 7 has a form of "⌉" to support a rear end portion of the front bearing 6*a* mounted on a front end portion of the shaft 4. The front end portion of the shaft 4 is fixed to a spider 10 in the rear wall 200 of the drum 3, a region of the shaft 4 from a portion exposed at a rear of the spider 10 to the front bearing 6*a* has a bushing 11 of brass press fit thereon for prevention of rusting, and there is a sealing member 12 on an outer surface of the bushing 11 for preventing ingress of water toward the front bearing 6*a*. The connector 16 is serration coupled to the rear end portion of the shaft 4 for connection between the rotor 13 of the direct coupling type motor 5 and the shaft 4, the rotor 13 is fixed to the connector 16 with fastening members 15*c*, and the stator 14, forming the direct coupling type motor together with the rotor 13, is fixed to the rear wall 200 of the tub 2 inward of the rotor 13. As shown in FIGS. 3~5, the rotor 13 of steel or steel alloy plate includes a bend part having a magnet setting surface 130 formed along a circumferential direction of a sidewall 13*b* extended forward from a periphery of the rear wall 13*a* of the rotor 13, for supporting magnets 13*c* fitted to a front portion of an inside surface of the rotor 13, and a hub 132 having a through hole 131 at a center of the rear wall 13*a* of the rotor 13 so that a fastening member 15*a*, such as a bolt or the like, can pass through for coupling the rotor 13 to the shaft 4. An overall form of the rotor 13 is preferably formed by pressing. There are a plurality of cooling fins 133 each formed to have a preset length in a radial direction around the hub 132 of the rotor 13 for blowing air toward the stator 14 during rotation of the rotor 13 for cooling heat generated at the stator 14. The cooling fins 133 are formed by lancing, to bend the cooling fins 133 at a right angle with respect to the rear wall 13*a* oriented toward the opening to leave through holes 134 for ventilation. There is an embossing 135 between adjacent cooling fins 133 with a drain hole 136 therein for draining water. There are fastening holes 137 for fastening a connector 16 to the rotor 13 and positioning holes 138 for positioning an assembly position of the connector 16 around the through hole 131 in the hub 132 of the rotor 13 at fixed intervals. The connector 16 is serration coupled to an outer circumference of a rear end portion of the shaft 4 exposed at a rear of the rear bearing 6*b*. The connector 16 is formed of resin having a vibration mode different from the rotor 13 of steel or steel alloy plate. As shown in FIGS. 7~9, the connector 16 has fastening holes 162 to correspond to the fastening holes 137 in the hub 132 of the rotor 13 arranged in a circumferential direction of a peripheral region thereof and a dowel pin 160 between adjacent fastening holes 162 formed as a unit with the connector 16 for insertion in the positioning hole 138 in the rotor 13 for self alignment of the fastening holes 137 and 162 in the rotor 13 and the connector 16, respectively. The connector 16 has a serration 164 in an inside circumference of the hub 163 matched to the serration on the rear end of the shaft 4, and reinforcing ribs 161 on an outer circumference of the hub 163 for reinforcing the hub 163. There is a hub 201 on the rear wall 200 of the tub 2 having the bearing housing 7 inserted therein when the tub 2 is injection molded, and fastening bosses 202 on an outer side of the hub 201 along a circumferential direction at fixed intervals for fastening the stator 14 to the rear wall 200 of the tub 2. There is a supporter 17 between the rear wall 200 of the tub 2 and the stator 14, having a form almost identical to an outline of the rear wall 200, fixed to the tub 2 rear wall 200 when the stator 14 is assembled for supporting the stator 14 and maintaining concentricity of the stator 14. Once the supporter 17 is fastened to the support fastening bosses 204, a fore end of the supporter 17 is brought into close contact with an inside of ribs 203 at one side of the tub rear wall 200, and a rear end thereof is brought into close contact with an outer circumference of a rear end of the bearing housing 7 which is not enclosed by the hub 132, but exposed. Thus, the supporter 17 supports the stator 14 and maintains a concentricity of the stator 14. In the meantime, as shown in FIGS. 3 and 6, the stator 14 includes a ring formed frame 140, a coil 142 wound around each of winding parts 141 on an outer circumference of the frame 140, and fastening ribs 143 on an inside of the frame 140 for fastening the stator 14 to the tub rear wall 200.

In the meantime, referring to FIG. 9, there is an "L" formed step 9*b* at an inner end portion of the bearing bracket 9 fixed to the tub rear wall 200 to cover an outer side of the rotor 13. And, there is a rear bearing fixing member 15*b* at a rear end of the shaft 4 for supporting a rear surface of the shaft 4 to prevent the rear bearing from being separated from the shaft 4.

The operation of the driving unit in a drum type washing machine in accordance with a second preferred embodiment of the present invention will be explained. The rotor 13 is rotated in response to a current flowing to the coils 142 of the stator 14 in a sequence under the control of a motor driving controller (not shown) fitted on a panel, and the shaft 4, which is serration coupled with the connector 16 fixed to the rotor 13, is rotated, together with the drum 3 as power is transmitted to the drum 3 through the shaft 4.

The drum type washing machine in accordance with the second preferred embodiment of the present invention has advantages. Like the first embodiment of the present invention, since the tub 2 is formed of a plastic with excellent heat resistance, the tub 2 is light and has good formability as the tub 2 is injection molded. Since the bearing housing 7 is formed of a metal, such as an aluminum alloy and the like, the bearing housing 7 is applicable to a drum type washing machine also having a drying cycle as the bearing housing 7 shows no thermal deformation. And, since the metallic bearing housing 7 is formed integrated with the tub 2 by inserting the bearing housing 7 in the hub 201 on the tub rear wall 200 before the tub 2 of plastic is injection molded, a separate step for assembling the bearing housing 7 to the tub rear wall 200 can be omitted, which simplifies an assembly process and reduces assembly man-hours. The step 7*a* in an inner circumference of a front portion of the bearing housing 7 in the second embodiment of the present invention supports a rear end of the front bearing 6*a* mounted on an outer circumference of the fore end portion of the shaft 4. That is, the "⌉" formed step 7*a* in a front portion of an inner circumference of the metallic bearing housing 7 of the present invention provides support to the front bearing 6*a* without being separated from the bearing housing 7. And, the "⌊" formed step 9*b* in an end portion of an inner circumference of the metallic bearing bracket 9 covering an outer side of the rotor 13 fixed to the tub rear wall 200 provides support to a front end of the rear bearing 6*b* mounted on the rear end portion of the shaft 4, and the rear bearing fixing member 15*b* on the rear end surface of the shaft 4 prevents the rear bearing 6*b* from being separated from the shaft 4.

In the meantime, in the second preferred embodiment of the present invention, since the front bearing 6*a* is mounted in the bearing housing 7 having been insert injection molded in the tub 2, and the rear bearing 6*b* is mounted in an inside of a center portion of the bearing bracket 9, a distance between the front and rear bearings 6*a* and 6*b* on the shaft 4 becomes greater, between which the rotor 13 is mounted. The greater distance between the front and rear bearings 6*a* and 6*b* better withstands a load caused by imbalance of laundry in the drum 3 during spinning, and a supporting force to the rotor 13 is enhanced as the rotor 13 of the motor is mounted between the front and rear bearings 6*a* and 6*b*. Like the first preferred embodiment of the present invention, in the second preferred embodiment of the present invention, the brass bushing 11 press fit to the region from the exposed portion outside of the spider 10 of the shaft 4 to the front bearing 6*a* prevents rusting of the shaft 4. Similarly, the sealing member 12 outside of the bushing 11 prevents ingress of water toward the bearing.

Like the first preferred embodiment, as shown in FIGS. 3 to 6, the bend part having the magnet setting surface 130 is formed along a circumferential direction of the sidewall 13*b* extended forward from a periphery of the rear wall 13*a* of the rotor 13, for supporting the magnets 13*c* when the magnets 13*c* are fitted to an inside surface of the rotor 13, to fabricate the rotor with ease. Like the first preferred embodiment of the present invention, in the second preferred embodiment of the present invention, the plurality of cooling fins 133 around the hub 132 of the rotor 13 in a radial direction having a certain length blow air toward the stator 14 during rotation of the rotor 13 for cooling down heat generated at the stator 14. The cooling fins 133 are formed by lancing, oriented toward the opening of the rotor 13, and leave through holes 134 for ventilation. Since the rotor 13 is formed of steel or steel alloy plate by pressing, which shortens a fabrication time period significantly, productivity is improved. The embossing 135 between the adjacent cooling fins 133 of the rear wall 13*a* of the rotor 13 improves an overall strength of the rotor 13, and the drain hole 136 in the embossing 135 drains water.

In the meantime, the fastening holes 137 for fastening the connector and the positioning holes 138 for fixing an assembly position of the connector 16 around the through hole 131 in the hub 132 of the rotor 13 permits an easy assembly of the connector 16 to the rotor 13. The connector 16 is serration coupled to the outer circumference of the rear end portion of the shaft 4. That is, once the dowel pins 160 on the connector 16 are inserted in the positioning holes 138 in the rotor 13, the fastening holes 137 and 162 in the rotor 13 and the connector 16 are matched automatically, and by fastening the fastening members 15*c* through the fastening holes 137 and 162, the connector 16 and the rotor 13 can be assembled with ease. The connector 16 serves to damp vibration from the rotor 13 to the shaft 4 as the connector 16 injection molded of a resin has a different vibration mode from the rotor 13 of steel or steel alloy plate. The serration 164 in the inner circumference of the hub 163 of the connector 16 is fit to the serration 400 on the rear end portion of the shaft 4, to transmit the rotating force of the rotor 13 to the shaft, directly. The reinforcing ribs 161 on an outer circumference of the hub 163 of the connector 16 reinforce the hub 163.

In the meantime, the fastening bosses 202 along a circumference on an outer side of the hub 201 on the rear wall 200 of the tub 2 at fixed intervals permit the stator 14 to be fixed to the rear wall 200 of the tub 2 by using the fastening boss 202. The supporter 17 between the rear wall 200 of the tub 2 and the stator 14 having a form almost identical to the outline of the rear wall 200 for being fixed to the rear wall 200 of the tub 2 when the stator 14 is fastened permits the stator 14 to be supported and concentricity to be maintained. That is, the front end of the supporter 17 is brought into close contact with an inside surface of the ribs 203 at one side of the tub rear wall 200 and the rear end of the supporter 17 is brought into close contact with the outer circumference of the rear end portion of the bearing housing 7 at a central portion of the tub rear wall 200, which can not be enclosed, but exposed, by the hub 132, such that the supporter 17 supports the stator 14 as well as maintains a concentricity of the stator 14.

The structure of a driving unit in a drum type washing machine in accordance with a second preferred embodiment of the present invention has the following advantages.

The motor direct coupling structure of the drum type washing machine of the present invention provides reduced repair, noise and power loss.

The bearing housing of metal in the drum type washing machine of the present invention shows no thermal deformation, and may be applied to a product having a drying function.

The rotor of steel or steel alloy plate formed by pressing in the drum type washing machine of the present invention requires a very short fabrication time period, with improved productivity, because the steel or steel alloy plate pressing has excellent formability.

And, the magnet setting surface on the rotor of the present invention improves a workability in fitting the magnets, and the drain holes, the cooling fins, and the through holes provided to the rotor can prevent overheating of the motor, improve a reliability of the motor, and prolong a lifetime of the motor.

And, the connector having a vibration mode different from the rotor in the drum type washing machine of the present invention can attenuate the vibration transmitted from the rotor to the shaft, and the supporter can support the stator and maintain a concentricity of the stator.

Particularly, in the second preferred embodiment of the present invention, the greater distance between the front and rear bearings permits better withstands a load caused by imbalance of laundry in the drum 3 during spinning, and a supporting capability to the rotor is enhanced as the rotor of the motor is mounted between the front and rear bearings.

Thus, by improving a structure of a driving unit of a drum type washing machine, the present invention can reduce noise, repair and power loss, can improve a washing capability, can improve a product reliability, and, by improving workability in fabrication of components of the driving unit, can improve a productivity.

It will be apparent to those skilled in the art that various modifications and variations can be made in the structure of a driving unit in a drum type washing machine of the present invention without departing from the spirit or scope of the invention. Thus, it is intended that the present invention cover the modifications and variations of this invention provided they come within the scope of the appended claims and their equivalents.

The invention claimed is:

1. A method of forming a washing machine, the method comprising:

forming a tub of a plastic material, the tub including a rear wall having reinforcing ribs extending outward from an outer rear surface thereof, a cylindrical sidewall that is integrally molded with the rear wall, and an open front face, wherein forming the tub includes insert molding a bearing housing in the rear wall of the tub;

connecting a first end portion of a shaft directly to a drum that is rotatably installed in the tub, wherein the drum comprises a rear wall, a cylindrical side wall, and an open front face that corresponds to the open front face of the tub, and wherein the drum is configured to receive laundry items therein;

inserting the shaft directly connected to the drum into the bearing housing;

mounting a rigid supporter to the rear wall of the tub, comprising mounting the supporter such that the supporter contacts portions of the rear wall of the tub and the bearing housing;

aligning a stator on the supporter, and then directly fixing the stator to the tub; and directly coupling a rotor to a second end portion of the shaft.

2. The method of claim 1, wherein insert molding the bearing housing in the rear wall of the tub comprises insert molding the bearing housing in the rear wall of the tub such that a rear portion of the bearing housing projects from the rear wall of the tub so as to form a hub portion of the tub.

3. The method of claim 2, wherein mounting the rigid supporter to the rear wall of the tub comprises mounting the supporter such that an inner circumferential surface of an aperture formed at a center of the supporter directly abuts and supports a corresponding outer circumferential surface of the hub portion of the tub comprising the rear portion of the bearing housing so as to maintain concentricity between the bearing housing and the stator.

4. The method of claim 2, wherein mounting the rigid supporter to the rear wall of the tub comprises mounting the supporter such that an inner circumferential surface of an aperture formed at a center of the supporter surrounds a corresponding outer circumferential surface of the hub portion of the tub comprising the rear portion of the bearing housing so as to maintain concentricity between the bearing housing and the stator.

5. The method of claim 1, wherein the rotor includes a connector, and wherein directly coupling the rotor to the second end portion of the shaft comprises directly coupling the connector of the rotor to the second end portion of the shaft.

6. The method of claim 5, wherein the connector of the rotor is made of an electrically insulating material so as to electrically insulate the rotor from the shaft.

7. The method of claim 5, further comprising attaching the connector to a rear wall of the rotor prior to directly coupling the rotor to the second end portion of the shaft, comprising:

sliding a plurality of positioning pins formed on the connector into a plurality of positioning holes formed in the rear wall of the rotor; and fixing the connector to the rear wall of the rotor with a plurality of fasteners.

8. The method of claim 7, wherein fixing the connector to the rear wall of the rotor with a plurality of fasteners comprises inserting the plurality of fasteners through a plurality of fastening holes formed in the connector and into a corresponding plurality of threaded fastening holes formed in the rotor.

9. The method of claim 8, wherein a diameter of the plurality of threaded fastening holes formed in the rotor is less than a diameter of the plurality of positioning pins formed on the connector such that the plurality of positioning pins cannot be inserted into the plurality of threaded fastening holes.

10. The method of claim 1, wherein the drum includes a spider provided in a rear wall thereof, and wherein directly connecting the first end portion of the shat to the drum comprises directly connecting the first end portion of the shaft to the spider such that an outer circumferential surface of shaft directly contacts an inner circumferential surface of the spider so as to fix the shaft to the drum such that the shaft and the drum rotate together.

11. The method of claim 1, wherein the integrally molded sidewall of the tub is substantially cylindrical and extends substantially horizontally forward from the rear wall of the tub to an open front face of the tub.

* * * * *